United States Patent [19]

Keijsper et al.

[11] Patent Number: 5,275,799
[45] Date of Patent: Jan. 4, 1994

[54] PROCESS FOR PREPARING A CRYSTALLINE ZEOLITE

[75] Inventors: Johannes J. Keijsper; Munro Mackay, both of CM Amsterdam, Netherlands

[73] Assignee: Shell Oil Company, Houston, Tex.

[21] Appl. No.: 863,921

[22] Filed: Apr. 6, 1992

[30] Foreign Application Priority Data

Apr. 8, 1991 [GB] United Kingdom ............... 9107311

[51] Int. Cl.$^5$ ............................................. C01B 33/34
[52] U.S. Cl. ........................................ 423/702; 423/701
[58] Field of Search ......................... 423/700, 701, 702

[56] References Cited

U.S. PATENT DOCUMENTS 4,657,748  4/1987  Vaughan et al. ................... 423/328

FOREIGN PATENT DOCUMENTS 219810A   10/1985  European Pat. Off. .
195646A2   9/1986  European Pat. Off. .
0333283A2  9/1989  European Pat. Off. .

OTHER PUBLICATIONS

Nature, vol. 329, No. 6142, Oct. 1987, London GB, pp. 819–821, M. D. Leonowicz et al.

Primary Examiner—R. Bruce Breneman

[57] ABSTRACT

The invention relates to a process for preparing a crystalline zeolite having a molar composition:

$$(0.9-1.1)MO \cdot X_2O_3 \cdot (5-20)SiO_2 \cdot (0.7-0.02)\text{trioxane} \cdot (0-10)H_2O$$

wherein M is one or two alkali or alkaline earth metal ions having a total valence of 2 and X is at least one of the metals aluminum, iron or gallium. The process comprises maintaining an aqueous mixture of a source of silica, a source of ions of the alkali or alkaline earth metal M, a source of an oxide of X and trioxane at an elevated temperature thereby forming the crystalline zeolite. The molar ratios initially present in the aqueous mixture are:

$X_2O_3:SiO_2 = 0.06-0.12$
$H_2O:SiO_2 = 5-30$
$OH^-:SiO_2 = 0.05-0.6$
$\text{trioxane}:SiO_2 = 0.1-2.0$
$MO:SiO_2 = 0.15-0.35$

10 Claims, No Drawings

PROCESS FOR PREPARING A CRYSTALLINE ZEOLITE

BACKGROUND OF THE INVENTION

1. Field of the Invention

The present invention relates to a process for preparing a novel crystalline zeolite utilizing trioxane as a template.

2. Description of the Prior Art

Various processes are available in the prior art to produce crystalline zeolites. U.S. Pat. No. 4,657,748, issued Apr. 14, 1987, describes the process for preparing the crystalline zeolite ECR-1. According to this reference, a tetraalkyl ammonium cation of the type $(CH_3)_2R'_2N^+$, wherein $R'$ is ethyl, propyl, butyl, hydroxyethyl or hydroxypropyl, is used as the organic template in the preparation of ECR-1. There are a number of drawbacks with regard to this crystalline zeolite though:

1) The template is expensive and/or difficult to synthesize.
2) The preparation occurs at a relatively high temperature for a relatively long period of time.
3) The product may contain non-porous analcite ($Na_2O.Al_2O_3.4\ SiO_2.2\ HOH$) and has a $SiO_2:Al_2O_3$ ratio of only 6.5 which limits its stability.

It has now been found that these drawbacks may easily be avoided if trioxane $(OCH_2OCH_2OCH_2)$ is used as the template in the preparation of this type of zeolite. Rather than ECR-1, a related but novel zeolite is produced.

SUMMARY OF THE INVENTION

The present invention provides a process for preparing a novel crystalline zeolite having in the as-synthesized form a molar composition:

$(0.9-1.1)MO.X_2O_3.(5-20)SiO_2.(0.7-0.02)$trioxane.$(0-10)H_2O$ wherein M is one or two alkali or alkaline earth metal ions having a total valence of 2, and X is at least one of the metals chosen from the group consisting of aluminum, iron or gallium. The process comprises maintaining an aqueous mixture comprising a source of silica, a source of an oxide of at least one of the metals aluminum, iron or gallium, a source of ions of alkali or alkaline earth metal M and trioxane at an elevated temperature until the crystalline zeolite is formed, separating the crystalline zeolite from the aqueous mixture and drying the crystalline zeolite. The molar ratios of components initially present in the aqueous mixture are:

$X_2O_3:SiO_2 = 0.06-0.12$
$H_2O:SiO_2 = 5-30$
$OH^-:SiO_2 = 0.05-0.6$
trioxane:$SiO_2 = 0.1-2.0$
$MO:SiO_2 = 0.15-0.35$

DESCRIPTION OF THE PREFERRED EMBODIMENT

The present invention is directed to a process for preparing a crystalline zeolite having in the as-synthesized form a molar composition expressed by the formula:

$(0.9-1.1)MO.X_2O_3.(5-20)SiO_2.(0.7-0.02)R.(0-10)H_2O$ wherein M is one or two alkali or alkaline earth metal ions having a total valence of 2 and X is at least one of the metals aluminum, iron or gallium. The process for preparing this crystalline zeolite comprises maintaining an aqueous mixture of a source of silica, a source of an oxide of at least one of the metals aluminum, iron or gallium, a source of ions of alkali or alkaline earth metal M and trioxane at an elevated temperature until the zeolite of the invention is formed. Once formed, the zeolite is separated from the mother liquor and dried. The various components in the aqueous mixture are initially present in the following molar ratios:

$X_2O_3:SiO_2 = 0.06-0.12$
$H_2O:SiO_2 = 5-30$
$OH^-:SiO_2 = 0.05-0.6$
trioxane:$SiO_2 = 0.1-2.0$
$MO:SiO_2 = 0.15-0.35$ More preferably, the various components in the aqueous mixture are initially present in the following ratios:

$X_2O_3:SiO_2 = 0.07-0.11$
$H_2O:SiO_2 = 10-25$
$OH^-:SiO_2 = 0.01-0.5$
trioxane:$SiO_2 = 0.2-1.5$
$MO:SiO_2 = 0.2-0.3$ When the ratio of $X_2O_3:SiO_2$ is higher than 0.12 in the aqueous mixture, zeolite omega traces of sodalite are formed instead of the present zeolite. When, on the other hand, the ratio of $X_2O_3:SiO_2$ in the reaction is lower than 0.06, sodalite-containing traces of mordenite result. Thus, the purity of the zeolite is greatly dependent upon the $X_2O_3:SiO_2$ ratio.

A ratio of $MO:SiO_2$ which is greater than 0.35 in the reaction mixture results in the formation of sodalite and a trace amount of zeolite omega. When the ratio of $MO:SiO_2$ is less than 0.15, the reaction product is mordenite. Thus, the nature of the product zeolite is greatly dependent upon the $MO:SiO_2$ ratio.

Alkali or alkaline earth metal sources may be used in the preparation of the zeolite of the invention. Alkali metal sources such as nitrates, carbonates, hydroxides and oxides are preferred. It is even more preferable if a sodium compound, in particular sodium hydroxide, is used.

Examples of suitable silica sources include solid silicas, silica sols, silica gels and siliceous acid. Suitable alumina sources include aluminum hydroxide, aluminum sulphate, gamma-alumina and sodium aluminate, with sodium aluminate being the preferable source. A suitable source of an oxide of iron includes iron nitrates, while a suitable source of an oxide of gallium includes gallium nitrate or freshly prepared gallium hydroxide.

The zeolite synthesis is preferably carried out in the presence of seed crystals since better product quality results when they are used. Preferably, these crystals are the preformed crystals of the zeolite of this invention. It is preferred to use the seed crystals in an amount from about 1% wt to about 10% wt calculated on the basis of the amount of $SiO_2$ in the aqueous synthesis mixture at the beginning of synthesis.

The present process may suitably be carried out by maintaining the aqueous mixture at a temperature above 100° C., more preferably in the range of from about 120°

C. to about 180° C. The aqueous mixture is preferably maintained at this temperature for at least six hours. As noted previously, the product obtained is separated from the mother liquor and dried, most suitably, by calcining at a temperature from about 500° C. to about 800° C. The process may be carried out either at autogenous pressure or at a more elevated pressure.

The zeolites prepared according to the present process may be utilized in any conventional process involving the use of zeolites. In particular, the zeolite is related to ECR-1 and enjoys the conventional utilities associated with ECR-1. The zeolite is particularly suitable as catalyst or catalyst carriers and/or absorbent means in hydroisomerization processes in which normal or slightly branched paraffins are converted to iso-paraffins.

The invention will be described by the following examples which are provided for illustrative purposes and are not to be construed as limiting the invention.

ILLUSTRATIVE EMBODIMENT 1

A zeolite was prepared by mixing an aqueous mixture of silica sol (40% wt $SiO_2$), NaOH, $NaAlO_2$, trioxane and ECR-1-related seeds (3% wt calculated on $SiO_2$ in the mixture) in water until a homogeneous gel was obtained. The gel was subsequently maintained at 150° C. for 30 hours in a stirred teflon-lined autoclave at autogenous pressure. The molar composition of the aqueous mixture was as follows:

$$40\ SiO_2.3.8\ Al_2O_3.10\ Na_2O.600\ H_2O.40\ trioxane$$

After synthesis, the solids were separated from the unreacted components, washed with water and dried at 120° C. The product which was of high crystallinity, was analyzed by X-ray diffraction and elemental analysis. It was found to have the following properties:

a) An X-ray powder diffraction pattern of which the 15 strongest lines are shown in Table I hereinbelow. (Relative error is 3%.)

TABLE I

| d(A) | Intensity |
|------|-----------|
| 9.0 | m (medium) |
| 7.8 | w (weak) |
| 6.7 | m |
| 6.3 | m |
| 5.9 | w |
| 4.5 | m |
| 4.20 | m |
| 3.71 | m |
| 3.65 | vs (very strong) |
| 3.56 | m |

TABLE I-continued

| d(A) | Intensity |
|------|-----------|
| 3.48 | vs |
| 3.23 | m |
| 3.16 | s (strong) |
| 3.00 | w |
| 2.58 | m | b) The molar composition is expressed by the formula:

$$0.10\ Na_2O.0.10\ Al_2O_3.0.06\ trioxane.0.50\ H_2O.$$

Subsequently, the crystalline product obtained was calcined in air at 600° C. for 18 hours then analyzed by X-ray diffraction and elemental analysis. It was found to have the following properties:

a) An X-ray powder diffraction pattern of the 16 strongest lines are shown in Table II hereinbelow. (Relative error is 3%.)

TABLE II

| d(A) | Intensity |
|------|-----------|
| 10.5 | w |
| 9.0 | s |
| 7.8 | w |
| 6.7 | m |
| 6.3 | s |
| 5.9 | m |
| 4.44 | m |
| 4.21 | m |
| 3.78 | m |
| 3.63 | vs |
| 3.48 | s |
| 3.23 | m |
| 3.17 | s |
| 3.01 | m |
| 2.90 | m |
| 2.57 | m | b) The molar composition is expressed by the formula:

$$0.09Na_2O.0.09Al_2O_3.SiO_2$$

ILLUSTRATIVE EMBODIMENTS 2–4 AND COMPARATIVE EXAMPLES A–E

The following Illustrative Embodiments 2–4 and Comparative Examples A–E have been carried out in a substantially analogous manner to that described in Illustrative Embodiment 1 (also included in Table III) but with the molar ratios given in Table III and Table IV. The nature of the zeolite produced is provided in Table III and Table IV:

TABLE III

| | | | | Illustrative Embodiments | | | | | |
|---|---|---|---|---|---|---|---|---|---|
| Emb. | $SiO_2$ | $Al_2O_3$ | $Na_2O$ | $H_2O$ | Trioxane | T°C. | t(hrs.) | Seed ECR-1 | Product |
| 1 | 40 | 3.8 | 10 | 600 | 40 | 150 | 30 | 3 wt % | ECR-1-related |
| 2 | 40 | 3.7 | 9.3 | 1000 | 30 | 150 | 24 | — | ECR-1-related |
| 3 | 40 | 4.5 | 8.0 | 1000 | 30 | 150 | 24 | — | ECR-1-related |
| 4 | 40 | 3.0 | 12.5 | 600 | 40 | 150 | 40 | 4 wt % | ECR-1-related |

TABLE IV

| | | | | Comparative Examples | | | | | |
|---|---|---|---|---|---|---|---|---|---|
| Ex. | $SiO_2$ | $Al_2O_3$ | $Na_2O$ | $H_2O$ | Trioxane | T°C. | t(hrs.) | Seed ECR-1 | Product |
| A | 40 | 3.0 | 12.5 | 600 | 10 | 150 | 72 | 4 wt % | ECR-1 + tr. |

TABLE IV-continued

| | | | Comparative Examples | | | | | | |
|---|---|---|---|---|---|---|---|---|---|
| Ex. | SiO$_2$ | Al$_2$O$_3$ | Na$_2$O | H$_2$O | Trioxane | T°C. | t(hrs.) | Seed ECR-1 | Product |
| B* | 40 | 5.0 | 12.0 | 600 | 40 | 150 | 48 | 3 wt % | zeolite omega zeolite omega |
| C** | 40 | 3.0 | 5.0 | 600 | 40 | 150 | 24 | 3 wt % | mordenite |
| D*** | 40 | 2.0 | 10 | 600 | 40 | 150 | 48 | 3 wt % | mordenite |
| E**** | 40 | 1.5 | 2.5 | 800 | 40 | 150 | 48 | 3 wt % | sodalite |

*Comparison; Al$_2$O$_3$:SiO$_2$ = 0.13 too high
**Comparison; Na$_2$O:SiO$_2$ = 0.13 too low
***Comparison; Al$_2$O$_3$:SiO$_2$ = 0.05 too low
***Comparison; Al$_2$O$_3$:SiO$_2$ and Na$_2$O = SiO$_2$ too low

What is claimed is:

1. A process for preparing an ECR-1 zeolite having in the as-synthesized form a molar composition:

(0.9–1.1)MO.X$_2$O$_3$.(5–20)SiO$_2$.(0.7–0.02)trioxane.(0–10)H$_2$O wherein M is one or two alkali or alkaline earth metal ions having a total valence of 2, and X is at least one of the metals selected from the group consisting of aluminum, iron and gallium, which process comprises:
 a. maintaining an aqueous mixture comprising a source of silica, a source of an oxide of at least one of the metals aluminum, iron or gallium, a source of ions of alkali or alkaline earth metal M and trioxane, wherein the molar ratios of the components initially present in the aqueous mixture are:
 X$_2$O$_3$:SiO$_2$ = 0.06–0.12
 H$_2$O:SiO$_2$ = 5–30
 OH$^-$:SiO$_2$ = 0.05–0.6
 trioxane:SiO$_2$ = 0.1–2.0
 MO:SiO$_2$ = 0.15–0.35
 at a temperature above 100° C., thereby forming the ECR-1 zeolite;
 b. separating the ECR-1 zeolite from the aqueous mixture; and
 c. drying the ECR-1 zeolite.

2. The process of claim 1 wherein the molar ratios of the various components initially present in the aqueous mixture are:
 X$_2$O$_3$:SiO$_2$ = 0.07–0.11
 H$_2$O:SiO$_2$ = 10–25
 OH$^-$:SiO$_2$ = 0.2–0.5
 trioxane:SiO$_2$ = 0.2–1.5
 MO:SiO$_2$ = 0.2–0.3.

3. The process of claim 2 wherein the source of alkali metal is a sodium compound.

4. The process of claim 2 wherein the crystalline zeolite is dried at a temperature from about 500° C. to about 800° C.

5. The process of claim 2 wherein the aqueous mixture is maintained at a temperature from about 120° C. to about 180° C. for at least 6 hours.

6. The process of claim 3 wherein the sodium compound is sodium hydroxide.

7. The process of claim 2 wherein seed crystals of the crystalline zeolite are present in the aqueous mixture.

8. The process of claim 7 wherein the seed crystals are present in an amount from about 1% wt to about 10% wt.

9. A process for preparing an ECR-1 zeolite having in the as-synthesized form a molar composition expressed by the formula:

(0.9–1.1)MO.X$_2$O$_3$.(5–20)SiO$_2$.(0.7–0.02)trioxane.(0–10)H$_2$O wherein M is one or two alkali or alkaline earth metal ions having a total valence of 2, and X is at least one of the metals selected from the group consisting of aluminum, iron and gallium, which process comprises:
 a. maintaining an aqueous mixture comprising a source of silica, a source of an oxide of at least one of the metals aluminum, iron or gallium, a source of ions of alkali or alkaline earth metal M and trioxane wherein the molar ratios initially present in the aqueous mixture are:
 X$_2$O$_3$:SiO$_2$ = 0.07–0.11
 H$_2$O:SiO$_2$ = 10–25
 OH$^-$:SiO$_2$ = 0.01–0.5
 trioxane:SiO$_2$ = 0.2–1.5
 MO:SiO$_2$ = 0.2–0.3
 at a temperature from about 120° C. to about 180° C. for at least 6 hours, thereby forming the ECR-1 zeolite;
 b. separating the ECR-1 zeolite from the aqueous mixture; and
 c. drying the ECR-1 zeolite at a temperature from about 500° C. to about 800° C.

10. An ECR-1 zeolite having in the assynthesized form a molar composition:

(0.9–1.1)MO.X$_2$O$_3$.(5–20)SiO$_2$.(0.7–0.02)trioxane.(0–10)H$_2$O wherein M is one or two alkali or alkaline earth metal ions having a total valence of 2, and X is at least one of the metals selected from the group consisting of aluminum, iron and gallium.

* * * * *